US012621225B2

(12) United States Patent
Yamanaka et al.

(10) Patent No.: US 12,621,225 B2
(45) Date of Patent: May 5, 2026

(54) ESTIMATION DEVICE, ESTIMATION METHOD, AND ESTIMATION PROGRAM

(71) Applicant: NTT, Inc., Tokyo (JP)

(72) Inventors: Yuki Yamanaka, Musashino (JP);
Tomohiro Nagai, Musashino (JP)

(73) Assignee: NTT, Inc., Tokyo (JP)

( * ) Notice: Subject to any disclaimer, the term of this patent is extended or adjusted under 35 U.S.C. 154(b) by 26 days.

(21) Appl. No.: 18/720,865

(22) PCT Filed: Dec. 17, 2021

(86) PCT No.: PCT/JP2021/046840
§ 371 (c)(1),
(2) Date: Jun. 17, 2024

(87) PCT Pub. No.: WO2023/112333
PCT Pub. Date: Jun. 22, 2023

(65) Prior Publication Data
US 2025/0071032 A1 Feb. 27, 2025

(51) Int. Cl.
*H04L 43/028* (2022.01)
*G06F 40/151* (2020.01)

(52) U.S. Cl.
CPC .......... *H04L 43/028* (2013.01); *G06F 40/151* (2020.01)

(58) Field of Classification Search
CPC .... G06F 40/103; G06F 40/143; G06F 40/151; H04L 43/16; H04L 43/20; H04L 69/22; H04L 43/04; H04L 43/12; H04L 43/026; H04L 43/028
See application file for complete search history.

(56) References Cited

U.S. PATENT DOCUMENTS

| | | | | |
|---|---|---|---|---|
| 10,320,813 B1* | 6/2019 | Ahmed | .............. | H04L 63/1416 |
| 11,200,464 B2* | 12/2021 | Shen | ...................... | G06V 10/82 |
| 2004/0098620 A1* | 5/2004 | Shay | ................... | H04L 63/0236 |
| | | | | 713/153 |
| 2004/0213214 A1* | 10/2004 | Jung | ..................... | H04W 72/30 |
| | | | | 370/352 |
| 2006/0198313 A1* | 9/2006 | Kitamura | ............ | H04L 12/4633 |
| 2009/0147683 A1* | 6/2009 | Mustafa | ................ | H04L 43/026 |
| | | | | 370/235 |
| 2009/0147806 A1* | 6/2009 | Brueckheimer | ...... | H04J 3/0667 |
| | | | | 370/503 |

(Continued)

OTHER PUBLICATIONS

Yamanaka et al., "Utilizing BERT for Feature Extraction of Packet Payload", The 35th Annual Conference of the Japanese Society for Artificial Intelligence, Jun. 14, 2021, pp. 1-3, including English Abstract.

*Primary Examiner* — Ninos Donabed
(74) *Attorney, Agent, or Firm* — XSENSUS LLP

(57) ABSTRACT

An estimation apparatus includes processing circuitry configured to extract a predetermined number of similar normal pieces of packet data with a relatively high similarity to abnormal packet data from among a plurality of normal pieces of packet data based on a natural language processing model, and extract same-length packet data with the same packet length as the abnormal packet data from the similar normal packet data extracted, and compare the abnormal packet data with the same-length packet data for each byte to estimate an abnormal byte location.

6 Claims, 10 Drawing Sheets

(56) References Cited

U.S. PATENT DOCUMENTS

| | | | |
|---|---|---|---|
| 2009/0193066 A1* | 7/2009 | Sato | H04L 1/00 |
| | | | 708/650 |
| 2009/0238088 A1* | 9/2009 | Tan | H04L 41/142 |
| | | | 370/252 |
| 2010/0223455 A1* | 9/2010 | Ata | H04L 63/0428 |
| | | | 713/150 |
| 2010/0238809 A1* | 9/2010 | Ito | H04N 1/00204 |
| | | | 370/242 |
| 2014/0003424 A1* | 1/2014 | Matsuhira | H04L 47/10 |
| | | | 370/389 |
| 2014/0229173 A1* | 8/2014 | Shin | G10L 19/22 |
| | | | 704/226 |
| 2014/0334304 A1* | 11/2014 | Zang | H04L 47/2441 |
| | | | 370/235 |
| 2015/0131445 A1* | 5/2015 | Nie | H04L 41/142 |
| | | | 370/235 |
| 2016/0048362 A1* | 2/2016 | Mizuguchi | G05B 19/042 |
| | | | 345/520 |
| 2016/0088124 A1* | 3/2016 | Jayasankar | H04L 69/22 |
| | | | 370/392 |
| 2016/0094244 A1* | 3/2016 | Alkathami | H03M 13/356 |
| | | | 714/819 |
| 2017/0095693 A1* | 4/2017 | Chang | G16H 40/40 |
| 2017/0303071 A1* | 10/2017 | Haverinen | H04B 17/27 |
| 2019/0190938 A1* | 6/2019 | Oba | H04L 43/16 |
| 2021/0064926 A1* | 3/2021 | Cho | G06N 3/0442 |
| 2021/0266748 A1* | 8/2021 | Wei | H04W 12/69 |
| 2022/0075953 A1* | 3/2022 | Khetan | G06N 3/04 |

* cited by examiner

Figure 9:
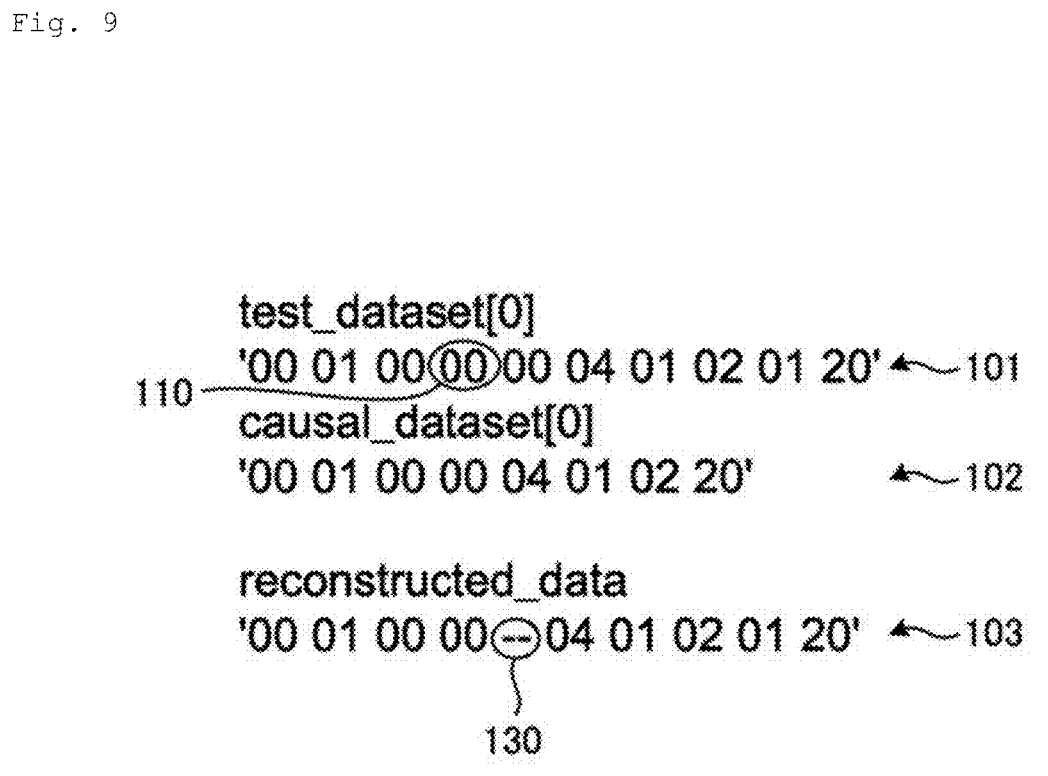

Fig. 9 test_dataset[0]
'00 01 00(00)00 04 01 02 01 20' ←—101
110 —
causal_dataset[0]
'00 01 00 00 04 01 02 20'    ←—102 reconstructed_data
'00 01 00 00(—)04 01 02 01 20'  ←—103
                    130

ESTIMATION DEVICE, ESTIMATION METHOD, AND ESTIMATION PROGRAM

CROSS-REFERENCE TO RELATED APPLICATION

The present application is based on PCT filing PCT/JP2021/046840, filed on Dec. 17, 2021, the entire contents of which are incorporated herein by reference.

TECHNICAL FIELD

The present invention relates to an estimation apparatus, an estimation method, and an estimation program.

BACKGROUND ART

An abnormality detection system or intrusion detection system (OT-IDS: Operational Technology Intrusion Detection System) has attracted attention in a communication network of an operational technology (OT) in an industrial system, a building system, and the like. In packets transmitted or received through such a communication network, unexpected operations, such as a temperature setting value being changed by one digit due to unauthorized rewriting, may cause a serious accident. Therefore, it is desirable to be able to detect unauthorized rewriting of one byte of a payload corresponding to content of the communication without fail. Therefore, precise analysis of payload content is essential in an abnormality detection system for a network control system in an industrial system and a building system.

As a technology for detailed analysis of payload content, for example, a technology for applying a natural language processing technology such as Bidirectional Encoder Representations from Transformers (BERT) to packet analysis, extracting information from a payload of any protocol, and performing abnormality detection is provided. Further, a technology for estimating an abnormal byte location as more information when detecting an abnormality has been proposed. This is a technology for searching for a normal packet that is most similar to the detected abnormal packet using, for example, BERTScore and comparing the normal packet with the abnormal packet in a high-dimensional space encoded by BERT.

CITATION LIST

Non Patent Literature

[NPL 1] Yuki Yamanaka, Masanori Yamada, Tomokatsu Takahashi, Tomohiro Nagai, "Feature Extraction of Packet Payload Using BERT," 2021 JSAI Annual Conference (35th)

SUMMARY OF INVENTION

Technical Problem

However, although a related art for estimating an abnormal byte location works well only under limited circumstances, it may be difficult to accurately estimate an abnormal byte location for some actual abnormal communications.

Solution to Problem

In order to solve the above-described problem and achieve the object, an estimation apparatus includes: processing circuitry configured to: extract a predetermined number of similar normal pieces of packet data with a relatively high similarity to abnormal packet data from among a plurality of normal pieces of packet data based on a natural language processing model; and extract same-length packet data with the same packet length as the abnormal packet data from the similar normal packet data extracted, and compare the abnormal packet data with the same-length packet data for each byte to estimate an abnormal byte location.

Advantageous Effects of Invention

According to the present invention, it is possible to accurately estimate the abnormal byte location in a communication protocol packet.

BRIEF DESCRIPTION OF DRAWINGS

FIG. 9 is a diagram illustrating results of an experiment using the information processing apparatus according to the embodiment.

DESCRIPTION OF EMBODIMENTS

Hereinafter, embodiments of the estimation apparatus, estimation method, and estimation program disclosed in the present application will be described in detail on the basis of the drawings. The estimation apparatus, estimation method, and estimation program disclosed in the present application are not limited to the following embodiments.

Figure 1:
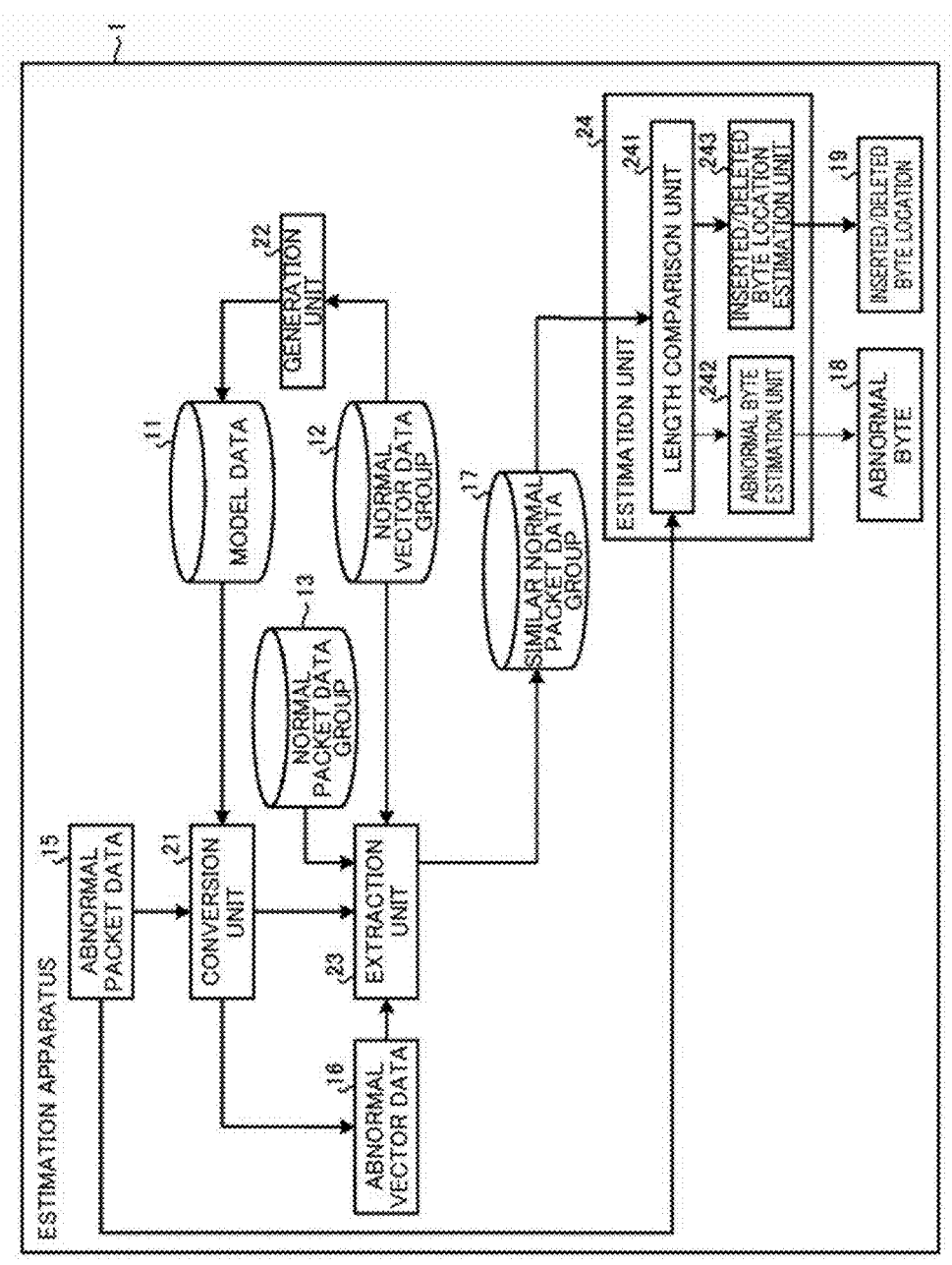
FIG. 1 is a block diagram of an information processing apparatus according to an embodiment.

[Estimation Apparatus] An estimation apparatus 1 according to an embodiment of the present invention will be described with reference to FIG. 1. When an abnormal packet is input, the estimation apparatus 1 estimates and outputs an abnormal byte in the abnormal packet. The estimation apparatus 1 compares the abnormal packet determined to be abnormal by another system with a normal packet determined to be normal by the other system, and estimates the abnormal bytes in the input abnormal packet or estimates an inserted byte location or a deleted byte location. For example, the normal packets and the abnormal packets are each collected in a communication network of one operation technology. The other system may use any method to determine whether the packet is normal or abnormal, and a determination method does not matter in the embodiment of the present invention.

The estimation apparatus 1 stores each piece of data of model data 11, a normal vector data group 12, a normal packet data group 13, abnormal packet data 15, abnormal vector data 16, a similar normal packet data group 17, the abnormal byte 18, and the inserted/deleted byte location 19. Further, the estimation apparatus 1 includes a conversion unit 21, a generation unit 22, an extraction unit 23, and an estimation unit 24.

The model data 11 specifies a model for converting packet data into vector data. The vector data associates each vector representing characteristics of the value of each byte with a byte of the packet data. The model data 11 is generated by the generation unit 22 to be described below learning a value of each byte of the plurality of normal pieces of packet data of the normal vector data group 12. The characteristics of the value of each byte are calculated through comparison with the value of each byte of the plurality of normal pieces of packet data.

Figure 2:
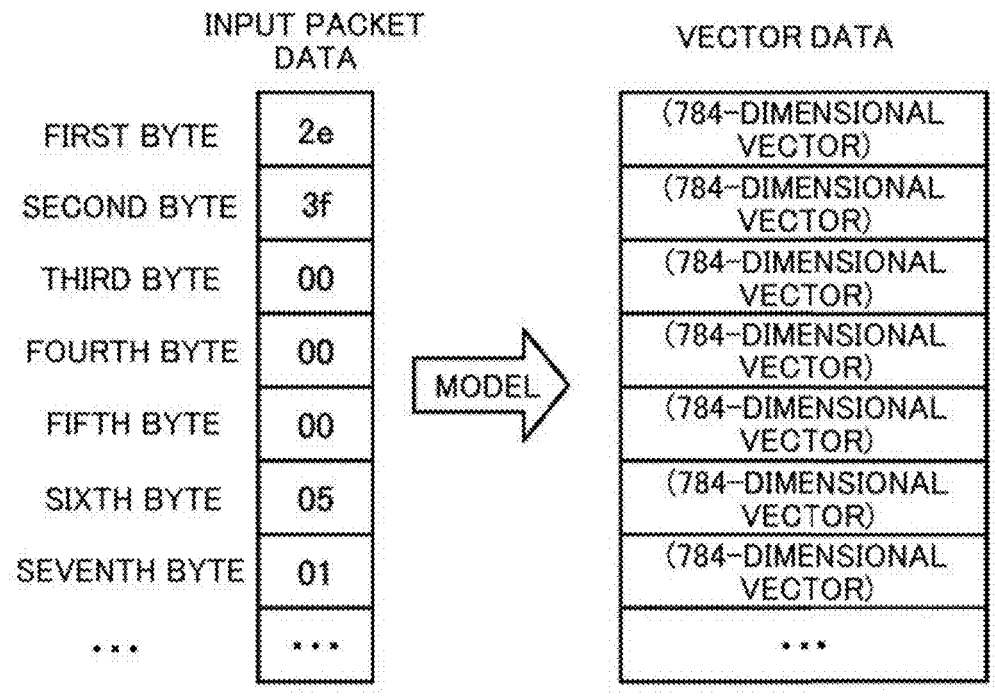
FIG. 2 is a block diagram illustrating details of a question generation unit.

The model data 11 specifies a model for converting each byte of the input packet data into an appropriate fixed-length vector in consideration of, for example, a positional relationship between the respective bytes. Here, the appropriate fixed-length vector is a vector with which the presence of an abnormal byte location can be detected by comparing the abnormal vector data 16 with the normal vector data in an estimation unit 24, which will be described below. For example, as illustrated in FIG. 2, there are a first byte value "2e," a second byte value "3f," a third byte value "00," . . . , and fixed-length packet data. Each byte of this packet data is converted into a 784-dimensional vector by the model. In the example illustrated in FIG. 2, the model converts each byte of packet data into a 784-dimensional vector representing the characteristics of the value of each byte.

The model data 11 is generated by BERT, for example. BERT is a natural language processing model. In embodiments of the present invention, each byte of packet data is regarded as a word. A model generated using BERT converts the packet data into vector data.

The normal packet data group 13 includes data of a plurality of packets specified as normal packets in other systems. For the normal packet data group 13, a normal packet data group used for BERT learning may be used, a packet data group determined to be normal by the estimation apparatus 1 most recently may be used, or a combination thereof may be used. With the more normal packet data included in the normal packet data group 13 used for comparison with the abnormal packet data 15, the estimation accuracy of the estimation apparatus 1 is improved.

The normal vector data group 12 includes the plurality of normal pieces of vector data. The normal vector data is data obtained by converting the normal packet data included in the normal packet data group 13 using the model specified by model data 11. The normal vector data group 12 is referred to when the generation unit 22 generates the model data 11 or when the extraction unit 23 extracts a similar normal vector data group similar to the abnormal vector data 16. Both the generation unit 22 and the extraction unit 23 may refer to the plurality of normal pieces of vector data included in the normal vector data group 12. Alternatively, the plurality of normal pieces of vector data included in the normal vector data group 12 may be divided into a plurality of groups, and the generation unit 22 may refer to one of the groups and the extraction unit 23 may refer to the other groups.

The abnormal packet data 15 is data of a packet identified as an abnormal packet in other systems. The estimation apparatus 1 estimates the abnormal byte 18 and the inserted/deleted byte location 19 for one piece of abnormal packet data 15.

The abnormal vector data 16 is data obtained by converting the abnormal packet data 15 with the model specified by the model data 11. The abnormal vector data 16 associates each vector representing the characteristics of the value of each byte with an identifier of a position of a byte of the abnormal packet data 15.

The similar normal packet data group 17 is a set of normal pieces of packet data before conversion of a similar normal vector data group. The similar normal vector data group is a set of data with a relatively high similarity to the abnormal vector data 16 among the plurality of normal pieces of vector data included in the normal vector data group 12. The similar normal vector data group is a set of a predetermined number of normal pieces of vector data in descending order of the similarity from the normal vector data with the highest similarity to the abnormal vector data 16 among the plurality of normal pieces of vector data included in the normal vector data group 12. Here, the predetermined number can be 100, for example. Alternatively, a group of similar normal pieces of vector data may be a set of predetermined number of normal pieces of vector data among normal vector data of which the similarity is higher than a predetermined threshold value. The similar normal packet data group 17 includes the same number of normal pieces of packet data as the predetermined number of normal pieces of vector data included in the similar normal vector data group. That is, the similar normal packet data group 17 includes the predetermined number of normal pieces of packet data.

The abnormal byte 18 is data for specifying a byte that is estimated to be abnormal among the bytes of the abnormal packet data 15. The abnormal byte 18 is specified, for example, by comparing each byte of the abnormal packet data 15 with each byte of normal packet data having the same length as the abnormal packet data 15 included in the similar normal packet data group 17 one by one.

The inserted/deleted byte location 19 is an inserted byte location at which insertion of an extra byte in the abnormal packet data 15 is suspected or a deleted byte location at which deletion of a normal byte is suspected. The inserted/deleted byte location 19 is estimated by calculating an edit distance between the abnormal packet data 15 and the similar normal packet data included in the similar normal packet data group 17, for example.

The conversion unit 21 converts the abnormal packet data 15 into abnormal vector data 16 using the model specified by the model data 11. For example, as illustrated in FIG. 2, the conversion unit 21 converts a value of each byte of the abnormal packet data 15 into a 784-dimensional vector. The conversion unit 21 associates the position of each byte of the abnormal packet data 15 with the 784-dimensional vector converted from the byte, and outputs the abnormal vector data 16.

The generation unit 22 learns the value of each byte of the plurality of normal pieces of packet data in the normal vector data group 12 and generates the model specified by the model data 11. The model converts the packet data into vector data in which each vector indicating the characteristics of the value of each byte is associated with a byte of the packet data. The generation unit 22 generates a model according to BERT, for example. The generation unit 22 may preliminarily learn the characteristics of each byte value in the normal packet data by solving auxiliary tasks such as a masked language model (MLM) or a next sentence prediction (NSP). The MLM predicts values of missing bytes in packets with a plurality of the missing bytes. The NSP determines whether the two pieces of packet data are consecutive packets. With these auxiliary tasks, the generation unit 22 specifies the validity of data within the packet and the validity of successive packets, and the generation unit 22 generates a model that specifies the normal vector data. The auxiliary tasks listed here are only examples, and the generation unit 22 may perform learning by solving other auxiliary tasks.

The extraction unit 23 extracts the predetermined number of normal pieces of vector data with a relatively high similarity to the abnormal vector data 16 from the plurality of normal pieces of vector data in the normal vector data group 12. The extraction unit 23 treats the extracted predetermined number of normal pieces of vector data as the group of similar normal pieces of vector data.

The relatively high similarity means that a similarity between the abnormal vector data 16 and certain normal vector data is higher than a similarity between the abnormal vector data 16 and other normal vector data. The extraction unit 23 may extract the predetermined number of normal pieces of vector data in descending order of the similarity from normal vector data with the highest similarity to the abnormal vector data 16. Here, the predetermined number can be 100, for example. Alternatively, the extraction unit 23 may extract the predetermined number of normal pieces of vector data from normal vector data of which the similarity is higher than a threshold value.

The extraction unit 23 calculates a similarity between the abnormal vector data 16 and each normal vector piece of data in the normal vector data group 12. The extraction unit 23 may calculate the similarity to some normal pieces of vector data in the normal vector data group 12. For example, some of the normal pieces of vector data are obtained by extracting a plurality of representative pieces of packet data from the plurality of normal pieces of packet data using MMD-Critic (MMD: Maximum Mean Discrepancy) and converting each extracted representative packet data using a model. Alternatively, some of the normal pieces of vector data are a plurality of normal pieces of vector data obtained by extracting normal packet data having the same packet length as the abnormal packet data 15 from the plurality of normal pieces of packet data and converting each extracted normal packet data with a model.

The extraction unit 23 may use BERTScore as the similarity. Alternatively, the extraction unit 23 may calculate the similarity between the vector of the abnormal vector data 16 and the vector of the normal vector data for each byte of the abnormal vector data 16, and calculate the similarity between the abnormal vector data 16 and normal vector data from the similarity calculated for each byte. A cosine similarity may be used as the similarity between vectors of the respective bytes. The similarity between the abnormal vector data 16 and the normal vector data is, for example, an average similarity calculated for the respective bytes. In this case, when the number of vectors of the abnormal vector data 16 is different from the number of vectors of the normal vector data, the similarity may be calculated according to the smaller number of vectors. The number of vectors of each vector data is the number of bytes of packet data before conversion.

Next, the extraction unit 23 acquires, from the normal packet data group 13, the predetermined number of normal pieces of packet data before conversion of the predetermined number of normal pieces of vector data included in the similar normal vector data group. The extraction unit 23 treats the acquired predetermined number of normal pieces of packet data as similar normal packet data, and sets a set of similar normal packet data as the similar normal packet data group 17.

The estimation unit 24 compares the abnormal packet data 15 with the similar normal packet data included in the similar normal packet data group 17 to estimate the abnormal bytes 18 included in the abnormal packet data 15, or estimate the inserted/deleted byte location 19 in the abnormal packet data 15. Details of the estimation by the estimation unit 24 will be described below. The estimation unit 24 includes a length comparison unit 241, an abnormal byte estimation unit 242, and an inserted/deleted byte location estimation unit 243, as illustrated in FIG. 1.

The length comparison unit 241 compares a packet length of the abnormal packet data 15 and a packet length of a predetermined number of similar normal pieces of packet data included in the similar normal packet data group 17. The length comparison unit 241 determines that rewriting of bytes has occurred when the number of similar normal packet data equal to or greater than a predetermined determination threshold value among the predetermined number of normal pieces of packet data has the same packet length as the abnormal packet data 15. Here, the determination threshold value is a parameter that can be designated. The determination threshold value can be, for example, a fixed value of 50%. Alternatively, the threshold value may be specified through a predetermined calculation. For example, a plurality of pairs of two similar normal pieces of packet data that are similar to each other may be extracted, and the threshold value may be specified from the lowest similarity among the similarities of the vectors of the two similar normal pieces of packet data corresponding to a predetermined byte. Hereinafter, the extracted normal packet data having the same packet length as the abnormal packet data 15 will be referred to as "same-length normal packet data". The length comparison unit 241 outputs the abnormal packet data 15 and the same-length normal packet data to the abnormal byte estimation unit 242.

On the other hand, when the number of the same-length normal pieces of packet data is smaller than the determination threshold value, the length comparison unit 241 determines that byte insertion or deletion has occurred, or that the abnormal packet data 15 is completely different from the normal packet data. The length comparison unit 241 outputs all of the abnormal packet data 15 and the predetermined number of normal pieces of packet data included in the similar normal packet data group 17 to the abnormal byte estimation unit 242.

The abnormal byte estimation unit 242 acquires the abnormal packet data 15 and the same-length normal packet data from the length comparison unit 241. The abnormal byte estimation unit 242 compares the acquired same-length normal packet data with the abnormal packet data 15 in order to specify a byte rewriting location in the abnormal packet data 15.

Specifically, the abnormal byte estimation unit 242 directly treats a value of a first byte of the same-length normal packet data extracted for comparison as a value between 0 and 255, to calculate an interquartile range. The abnormal byte estimation unit 242 determines whether or not the value of the first byte of the abnormal packet data 15 is included in the calculated interquartile range. When the value of the first byte of the abnormal packet data 15 is included in the calculated interquartile range, the abnormal byte estimation unit 242 determines that the first byte is normal. Further, when the value of the first byte of the abnormal packet data 15 is not included in the calculated interquartile range, the abnormal byte estimation unit 242 regards the first byte as an abnormal byte. Thereafter, the abnormal byte estimation unit 242 performs comparison of each byte in order of a second byte, a third byte, . . . , and determines whether each byte is the abnormal byte location to perform estimation of the abnormal byte. Although the interquartile range is used for comparison of each byte here, an available abnormality detection scheme, such as a non-parametric scheme or a naive Bayes method, is particularly not limited as long as the scheme is an abnormality detection scheme in which one-dimensional data is handled.

When there is the same-length normal packet data with the number of abnormal byte locations smaller than a certain value, the abnormal byte estimation unit 242 selects the normal packet data with the smallest abnormal byte location from among the same-length normal pieces of packet data with the number of abnormal byte locations smaller than the certain value as the final similar normal packet data. Thereafter, the abnormal byte estimation unit 242 estimates the stored abnormal byte location in the final similar normal packet data as the abnormal byte 18.

On the other hand, when the number of abnormal byte locations in all of the acquired the same-length normal pieces of packet data is equal to or greater than the certain value, the abnormal byte estimation unit 242 performs processing as having no final similar normal packet data corresponding to the abnormal packet data 15. Here, the constant value is, for example, a parameter that can designate about ⅓ to ½ of the packet length.

The inserted/deleted byte location estimation unit 243 acquires the abnormal packet data 15 and the predetermined number of normal pieces of packet data from the length comparison unit 241. The inserted/deleted byte location estimation unit 243 compares the acquired normal packet data with the abnormal packet data 15 in order to specify an inserted byte location or deleted byte location of the byte in the abnormal packet data 15.

Specifically, the inserted/deleted byte location estimation unit 243 calculates the edit distance between the abnormal packet data 15 and each normal packet piece of data using dynamic programming. The inserted/deleted byte location estimation unit 243 can calculate the edit distance and specify an inserted byte location suspected of insertion or a deleted byte location suspected of deletion.

When there is normal packet data of which the edit distance is smaller than a certain distance, the inserted/deleted byte location estimation unit 243 selects the normal packet data with the shortest edit distance from among the normal pieces of packet data of which the edit distance is smaller than the certain distance, as the similar normal packet data. The inserted/deleted byte location estimation unit 243 estimates the inserted/deleted byte location 19 using the edit distance of the selected final similar normal packet data.

On the other hand, when the edit distance is equal to or greater than the certain distance in all of the acquired normal pieces of packet data, the inserted/deleted byte location estimation unit 243 processes as having no final similar normal packet data corresponding to the abnormal packet data 15. Here, the certain distance is a parameter that can designate, for example, about ⅓ to ½ of the packet length.

Figure 3:
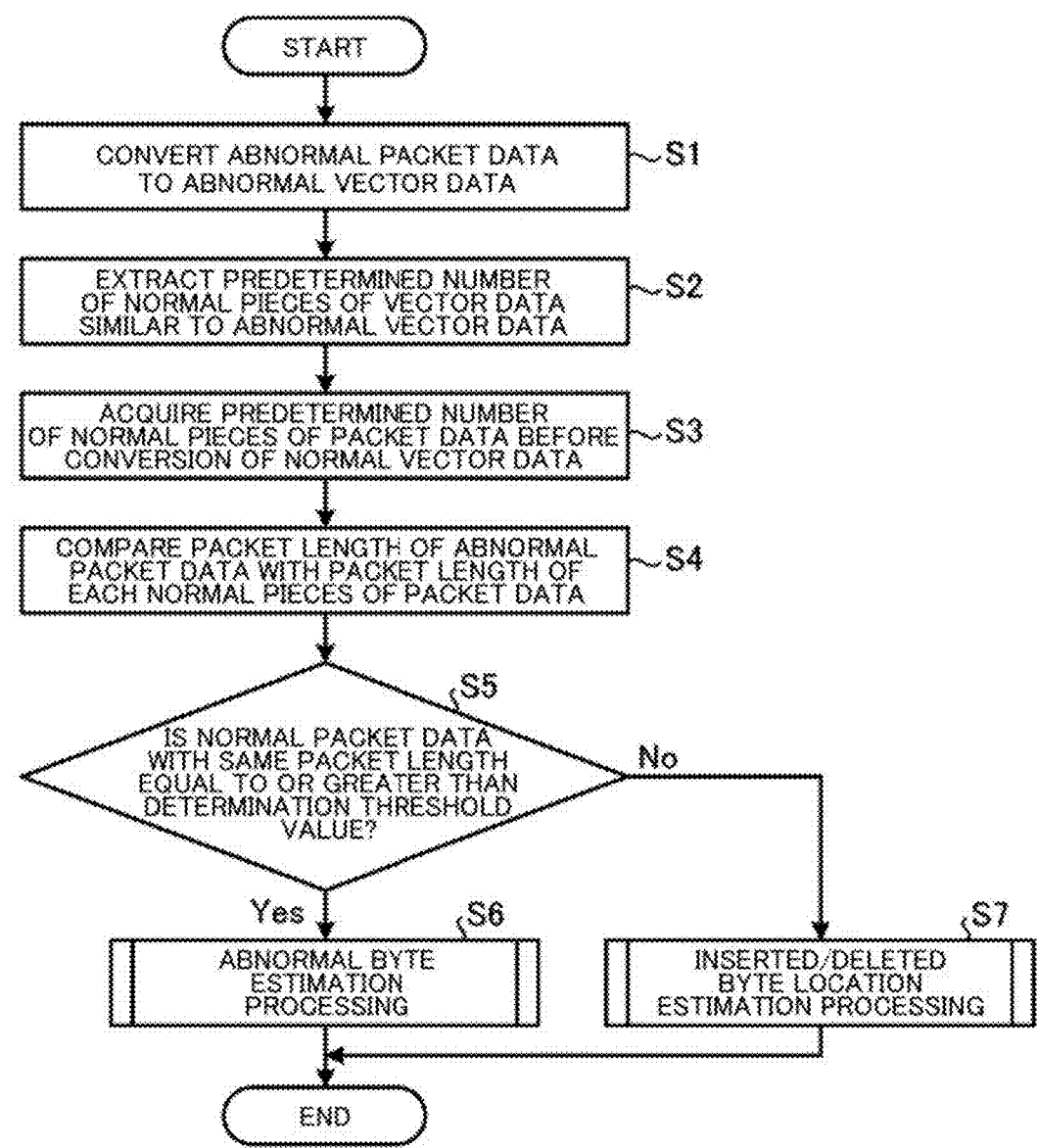
FIG. 3 is a block diagram of a machine learning apparatus that learns a question generation model.

[Processing of Embodiment] FIG. 3 is a flowchart of estimation processing in the estimation apparatus according to an embodiment. Next, a flow of the estimation processing in the estimation apparatus according to the present embodiment will be described with reference to FIG. 3.

The conversion unit 21 converts the abnormal packet data 15 into the abnormal vector data 16 (step S1).

The extraction unit 23 extracts the predetermined number of normal pieces of vector data similar to the abnormal vector data 16 converted in step S1 from the normal vector data group 12 (step S2) to obtain a similar normal vector data group.

Next, the extraction unit 23 acquires, from the normal packet data group 13, the predetermined number of normal pieces of packet data before conversion of the normal vector data included in the similar normal vector data group (step S3), and uses a set of similar normal pieces of packet data as a similar normal packet data group 17.

The length comparison unit 241 of the estimation unit 24 compares the abnormal packet data 15 with each similar normal packet piece of data included in the similar normal packet data group 17 (step S4). The length comparison unit 241 determines whether or not the number of normal pieces of packet data having the same packet length as the abnormal packet data 15 equal to or greater than the determination threshold value are included in the similar normal packet data group 17 (step S5).

When there are the number of the same-length normal pieces of packet data equal to or greater than the determination threshold value (Yes in step S5), the length comparison unit 241 determines that there is the abnormal byte 18. The length comparison unit 241 transmits the abnormal packet data 15 and the same-length normal packet data to the abnormal byte estimation unit 242. The abnormal byte estimation unit 242 acquires the abnormal packet data 15 and the same-length normal packet data, and executes abnormal byte estimation processing (step S6).

On the other hand, when the number of same-length normal packet data is smaller than the determination threshold value (step S5: No), the length comparison unit 241 determines that there is an inserted byte location or a deleted byte location. The length comparison unit 241 transmits all of the abnormal packet data 15 and the predetermined number of similar normal pieces of packet data included in the similar normal packet data group 17 to the inserted/deleted byte location estimation unit 243. The inserted/deleted byte location estimation unit 243 acquires the abnormal packet data 15 and the predetermined number of similar normal pieces of packet data, and executes inserted/deleted byte location estimation processing (step S7).

Figure 4:
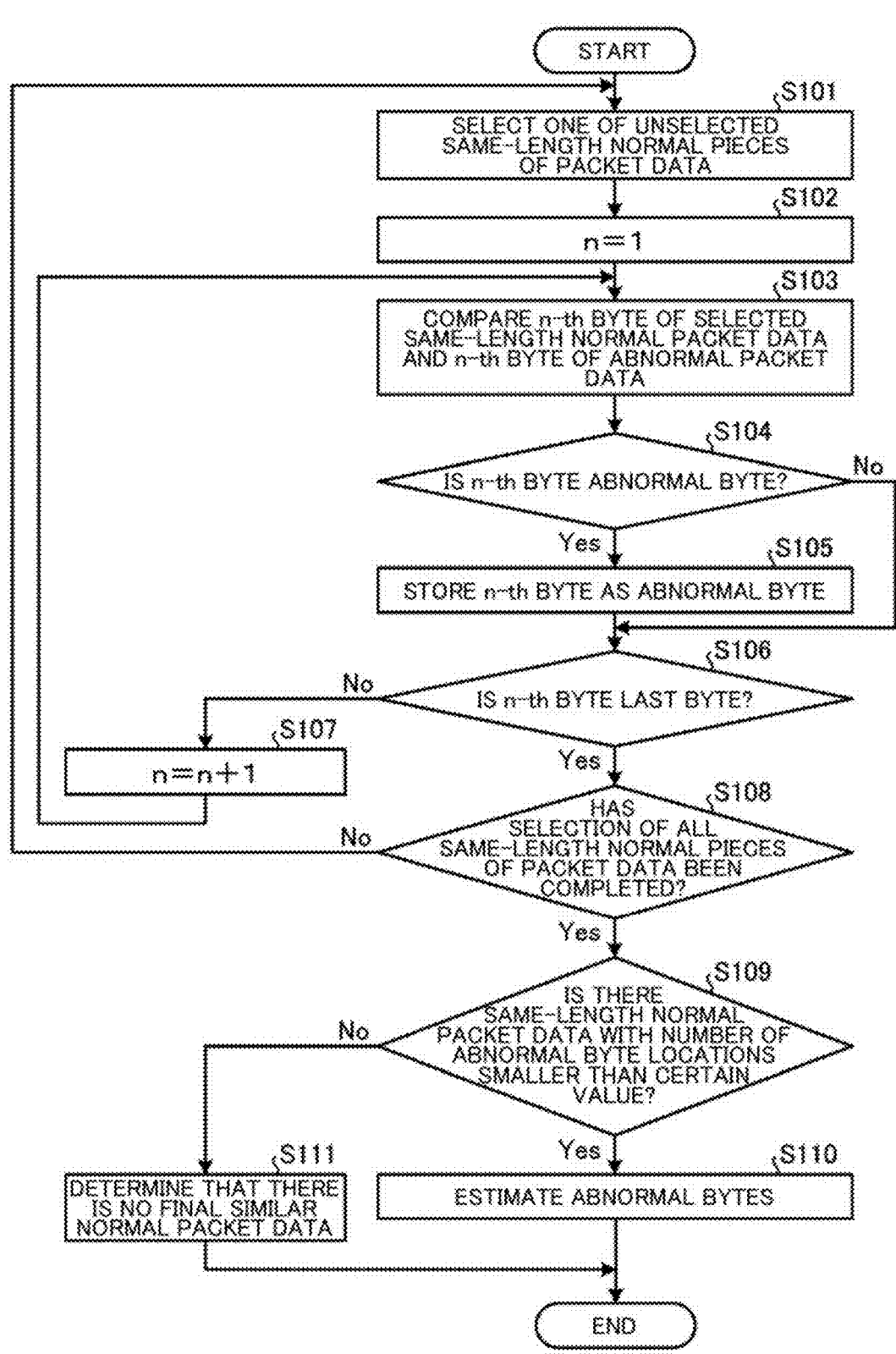
FIG. 4 is a diagram illustrating an example of question-answer learning data.

FIG. 4 is a flowchart of the abnormal byte estimation processing. A flow illustrated in FIG. 4 corresponds to an example of the abnormal byte estimation processing executed in step S6 in FIG. 3.

The abnormal byte estimation unit 242 selects one unselected same-length normal packet piece of data from the same-length normal packet data (step S101).

Next, the abnormal byte estimation unit 242 sets 1 which is a parameter representing the position of the byte to be compared to n (step S102).

Next, the abnormal byte estimation unit 242 compares an n-th byte of the selected same-length normal packet data with an n-th byte of the abnormal packet data 15 (step S103). For example, the abnormal byte estimation unit 242 directly treats a value of the n-th byte of the selected same-length normal packet data as a value between 0 and 255 to calculate the interquartile range. The abnormal byte estimation unit 242 determines whether or not the value of the n-th byte of the abnormal packet data 15 is included in the calculated interquartile range.

Next, the abnormal byte estimation unit 242 determines whether or not the n-th byte is an abnormal byte using a comparison result (step S104). For example, when the value of the n-th byte of the abnormal packet data 15 is included in the calculated interquartile range, the abnormal byte estimation unit 242 determines that the n-th byte is normal. Conversely, when the value of the n-th byte of the abnormal packet data 15 is not included in the calculated interquartile range, the abnormal byte estimation unit 242 regards the n-th byte as an abnormal byte. When the n-th byte is not an abnormal byte (step S104: No), the abnormal byte estimation unit 242 proceeds to step S106.

On the other hand, when the n-th byte is the abnormal byte (Yes in step S104), the abnormal byte estimation unit 242 stores the n-th byte in the abnormal packet data 15 as the abnormal byte location (step S105) and proceeds to S106.

The abnormal byte estimation unit 242 determines whether or not the n-th byte is the last byte in the abnormal packet data 15 (step S106). When the n-th byte is not the last byte (step S106: No), the abnormal byte estimation unit 242 increments n by 1 (step S107) and returns to step S103.

On the other hand, when the n-th byte is the last byte (Yes in step S106), the abnormal byte estimation unit 242 determines whether or not the selection of all the same-length normal pieces of packet data has been completed (step S108). When unselected same-length normal packet data remains (step S108: NO), the abnormal byte estimation unit 242 returns to step S101.

On the other hand, when all the same-length normal pieces of packet data have been selected (Yes in step S108), the abnormal byte estimation unit 242 determines whether or not there is the same-length normal packet data in which the number of locations of the stored abnormal bytes is smaller than the certain value (step S109).

When there is the same-length normal packet data with the number of abnormal byte locations smaller than the certain value (step S109: Yes), the abnormal byte estimation unit 242 performs the following processing. In this case, the abnormal byte estimation unit 242 selects normal packet data with the smallest number of abnormal byte locations as the final similar normal packet data from among the same-length normal pieces of packet data with the number of abnormal byte locations smaller than the certain value. The abnormal byte estimation unit 242 estimates the abnormal byte location of the stored abnormal packet data 15 for the final similar normal packet data as the abnormal byte 18 (step S110), and ends the abnormal byte estimation processing.

On the other hand, when there is no same-length normal packet data with the number of abnormal byte locations smaller than the certain value (step S109: NO), the abnormal byte estimation unit 242 determines that there is no final similar normal packet data (step S111), and ends the abnormal byte estimation processing.

Figure 5:
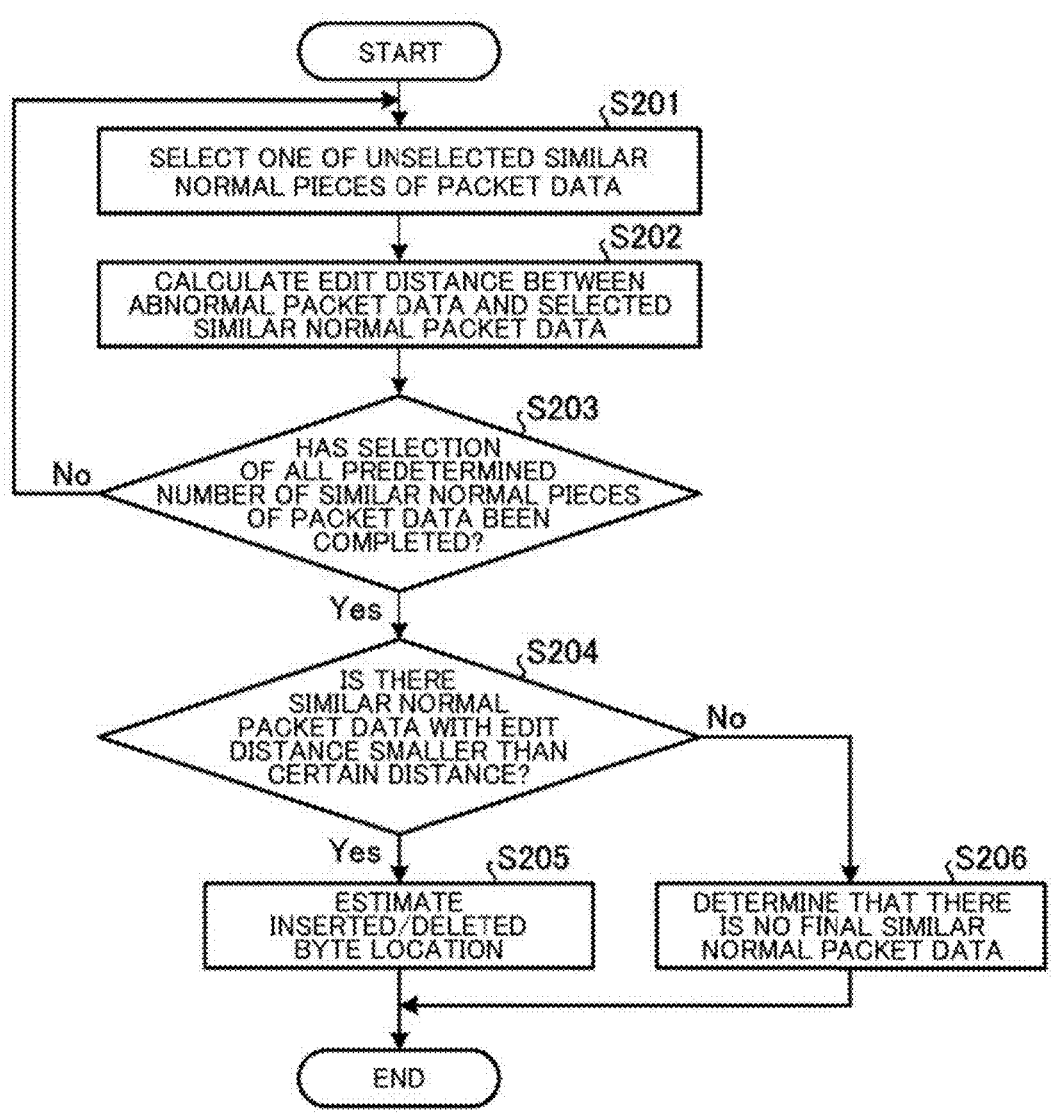
FIG. 5 is an image diagram of learning data for learning the question generation model.

FIG. 5 is a flowchart of the inserted/deleted byte location estimation processing. A flow illustrated in FIG. 5 corresponds to an example of inserted/deleted byte location estimation processing executed in step S7 in FIG. 3.

The inserted/deleted byte location estimation unit 243 selects one unselected normal packet piece of data from the predetermined number of similar normal pieces of packet data (step S201).

Next, the inserted/deleted byte location estimation unit 243 calculates the edit distance between the abnormal packet data 15 and the selected similar normal packet data using dynamic programming (step S202).

Next, the inserted/deleted byte location estimation unit 243 determines whether or not all the predetermined number of similar normal pieces of packet data have been selected (step S203). When unselected normal packet data among the predetermined number of similar normal pieces of packet data remains (step S203: NO), the inserted/deleted byte location estimation unit 243 returns to step S201.

On the other hand, when the selection of all the predetermined number of similar normal pieces of packet data is completed (step S203: Yes), the inserted/deleted byte location estimation unit 243 determines whether or not there is similar normal packet data of which the edit distance is smaller than the certain distance (step S204).

When there is similar normal packet data of which the edit distance is smaller than the certain distance (Yes in step S204), the inserted/deleted byte location estimation unit 243 executes the following processing. In this case, the inserted/deleted byte location estimation unit 243 selects the similar normal packet data with the shortest edit distance among the similar normal pieces of packet data of which the edit distance is smaller than the certain distance as the final similar normal packet data. The inserted/deleted byte location estimation unit 243 estimates the inserted/deleted byte location 19 using the edit distance between the selected final similar normal packet data and the abnormal packet data 15 (step S205), and ends the inserted/deleted byte location estimation processing.

On the other hand, when there is no similar normal packet data of which the edit distance is smaller than the certain distance (step S204: NO), the inserted/deleted byte location estimation unit 243 determines that there is no final similar normal packet data (step S206), and ends the abnormal byte estimation processing.

[Experimental Results] Next, experiment results when the estimation apparatus 1 according to the present embodiment has performed an experiment for estimating the abnormal byte 18 or inserted/deleted byte location 19 will be described. Here, the experiment was performed under the following conditions. BERT has been trained by performing learning with 30,000 Modbus/TCP. Further, 400 normal pieces of packet data and 100 abnormal pieces of packet data 15 were used as a data set.

The abnormal pieces of packet data 15 were input one by one in order to perform cause estimation. Further, in this experiment, only perfect match has been regarded as estimation success.

As a first experiment, a byte rewriting experiment in which n locations in the payload are rewritten with random bytes was performed.

Figure 6:
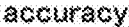
FIG. 6 is a diagram illustrating an example of question sentence creation in the information processing apparatus according to the embodiment.
Figure 6:
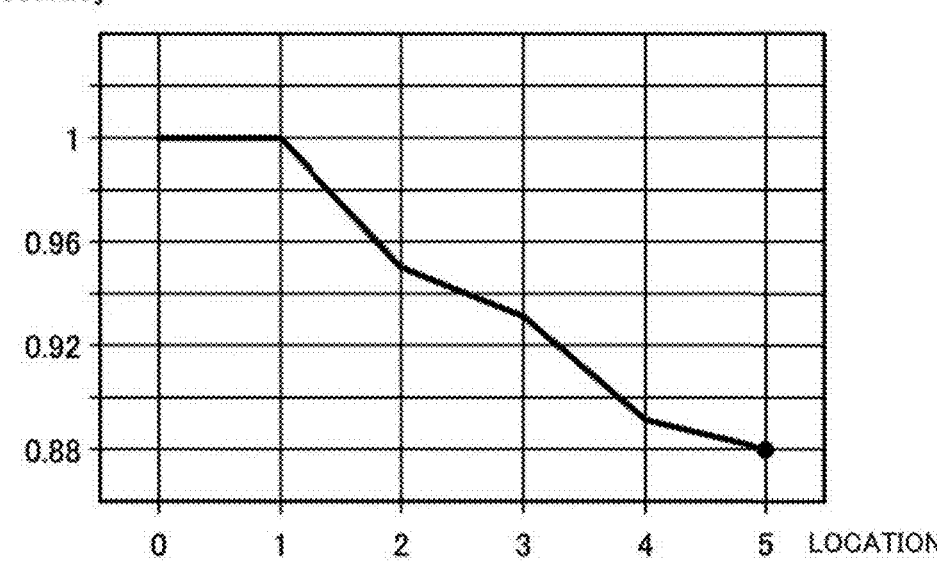
Figure 7:
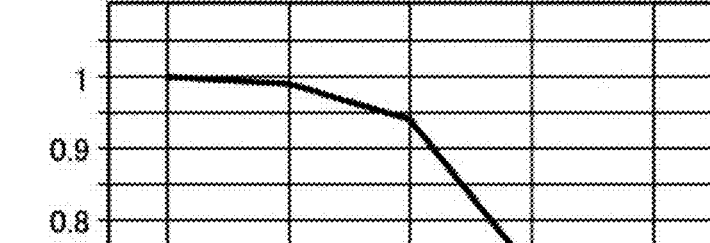
FIG. 7 is a flowchart of question generation processing in the information processing apparatus according to the embodiment.
Figure 7:
Figure 8:
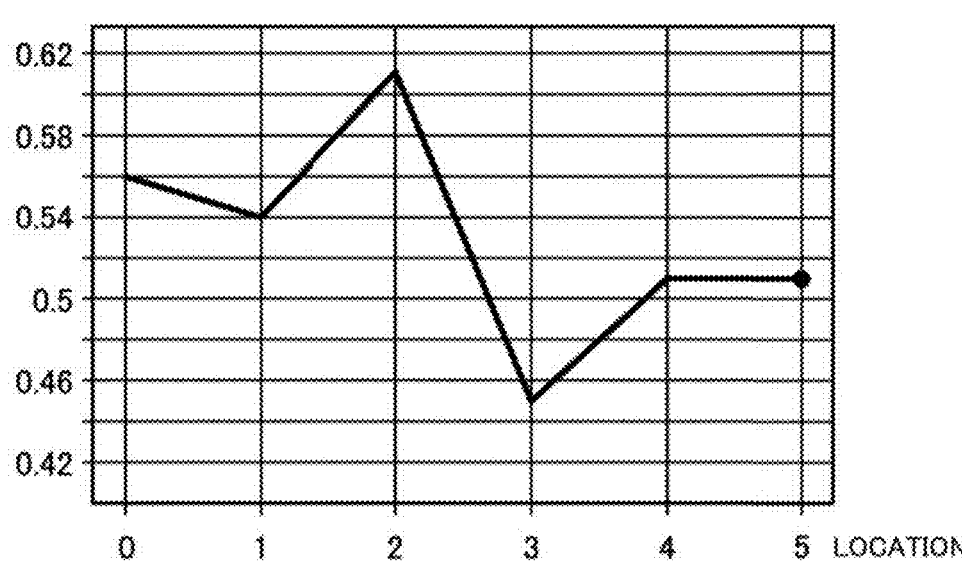
FIG. 8 is a flowchart of machine learning processing in the machine learning apparatus according to the embodiment.

FIG. 6 is a diagram illustrating experimental results when the rewriting of the byte has been performed. Further, FIG. 7 is a diagram illustrating experimental results when a random byte is inserted. Further, FIG. 8 is a diagram illustrating experimental results when bytes are deleted. In FIGS. 6 to 8, a vertical axis represents a rate of estimation success, and a horizontal axis represents the number of deleted bytes. Here, the rate of estimation success represents a rate of successful estimation, with 1 being a case in which the estimation is successful for all of 100 abnormal pieces of packet data 15.

In the case of an experiment in which bytes are rewritten, the estimation apparatus 1 can perform estimation of about 90% even when five locations are rewritten, as illustrated in FIG. 6. In this case, since the packet length ranges from 12 to 25, it can be considered that the estimation accuracy is quite good when the estimation can be substantially performed even when rewriting in five locations is performed.

In the case of an experiment in which a random byte is inserted, the estimation apparatus 1 can perform estimation of about 90% with rewriting in up to two locations, as illustrated in FIG. 7. However, the estimation accuracy drops with insertion into three or more locations, and the estimation accuracy drops to 50% with rewriting in five locations. One reason for this is thought to be that data packets with packet lengths of 12, 14, or 15 occupying the majority are mixed due to the insertion of the random bytes, and the extraction of the similar normal packet data group 17 by BERT did not work well. That is, when the packet length is not affected by the insertion of the random bytes, it is considered that the estimation accuracy will improve even when the insertion is made in three or more locations.

In the case of an experiment in which bytes are deleted, it seems that the estimation accuracy of the estimation performed by the estimation apparatus 1 is not obtained, as illustrated in FIG. 8. It is considered that this is due to the following reasons. FIG. 9 is a diagram illustrating causes of deterioration in accuracy of byte deletion. For example, an experiment in which data 101 in FIG. 9 is original normal packet data, and abnormal packet data 15 is generated by deleting byte 110 of the data 101 is considered. In this case, the estimation apparatus 1 generates data 102 as the abnormal packet data 15. When the data 102 is used for estimation of the deleted byte location, the estimation apparatus 1 may estimate a byte 130 in determination result packet data 103 as the deleted location. In this experiment, since such estimation is not treated as a correct answer, the estimation accuracy is degraded.

However, since bytes adjacent to the byte 110 in the data 101 of FIG. 9 have the same value, there is also deletion of a location different from an actual deletion location on the basis of the data 102. In this case, this may be considered equivalent even when any byte with the same value is deleted. Therefore, although it can be said that a determination result is strictly wrong, the determination result can also be considered to be roughly correct. In fact, in the case of visual confirmation, that is, when mistake in deleted byte locations in adjacent bytes having the same value is ignored, the estimation accuracy was about 90% when the number of deletion locations was about 3.

From the above experiment, it is considered that the estimation apparatus 1 according to the present embodiment can ensure high estimation accuracy in abnormality detection even when the abnormality is the rewriting of the byte, the insertion of the random byte, or the deletion of the byte.

[Effects of Embodiment] As described above, the estimation apparatus 1 according to the present embodiment extracts the predetermined number of similar normal pieces of packet data similar to the detected abnormal packet data 15 using BERT. The estimation apparatus 1 estimates an alteration location by comparing the abnormal packet data 15 with the similar normal packet data for each byte, and estimates the insertion byte location and the deletion byte location using edit distance calculation. This makes it possible to accurately estimate the abnormal byte location or inserted/deleted byte location 19 for packets of any communication protocol.

[System Configuration, or the Like] Further, each component of each illustrated apparatus is functionally conceptual, and does not necessarily need to be physically configured as illustrated. In other words, a specific form of distribution and integration of each apparatus is not limited to the illustrated one, and all or some of these can be functionally or physically distributed or integrated and configured in any units depending on various loads, use situations, or the like.

Further, all or some of respective processing functions performed by each apparatus may be realized by a central processing unit (CPU) and a program analyzed and executed by the CPU, or may be realized as hardware by wired logic.

Further, among the processing described in the embodiment, all or some of the processing described as being automatically performed can be performed manually, or all or some of processing described as being performed manually can be performed automatically by using a known method. Further, information including a processing procedure, control procedure, specific names, and various types of data or parameters illustrated in the above documents or drawings can be arbitrarily changed unless otherwise specified.

[Program] As an embodiment, the estimation apparatus 1 can be implemented by installing an information processing program for executing the question generation processing as package software or online software on a desired computer. For example, the computer can function as the estimation apparatus 1 by causing the computer to execute the estimation processing program. The computer referred to here includes a desktop or laptop personal computer. In addition, the computer includes a mobile communication terminal such as a smartphone, a mobile phone or a personal handy-phone system (PHS), and a slate terminal such as a personal digital assistant (PDA). The estimation apparatus 1 may be implemented as a Web server, or may be implemented as a cloud that provides service regarding the management processing by outsourcing.

Figure 10:
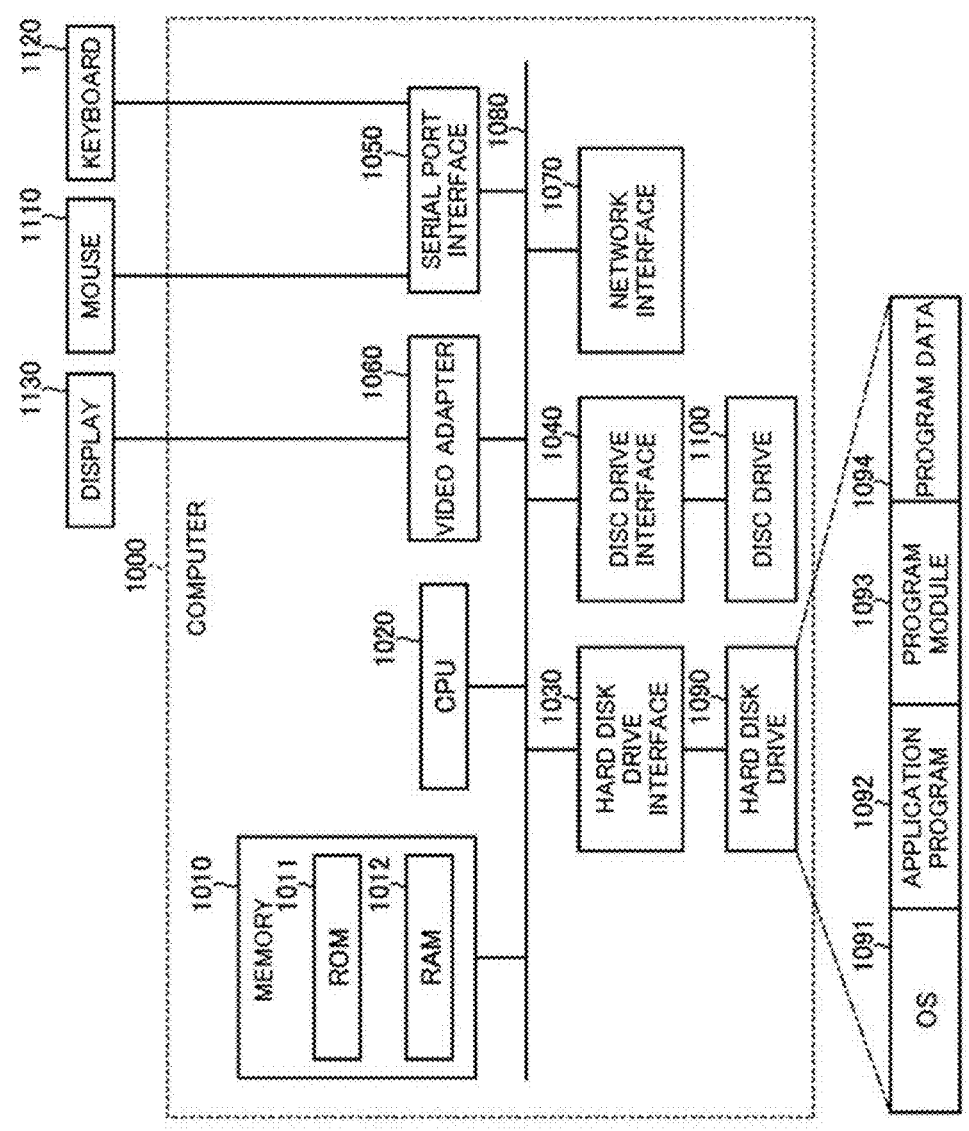
FIG. 10 is a diagram illustrating an example of a computer that executes an information processing program.

FIG. 10 is a diagram illustrating an example of a computer that executes an estimation processing program. A computer 1000 includes a memory 1010 and a CPU 1020, for example. Further, the computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program, such as a basic input output system (BIOS). The hard disk drive interface 1030 is connected to a hard disk drive 1090. The disk drive interface 1040 is connected to a disc drive 1100. A detachable storage medium such as a magnetic disk or optical disc, for example, is inserted into the disc drive 1100. The serial port interface 1050 is connected to an input unit 1200 such as a mouse 1110 or a keyboard 1120, for example. The video adapter 1060 is connected to the output unit 1300, such as a display 1130.

The hard disk drive 1090 stores an OS 1091, an application program 1092, a program module 1093, and program data 1094, for example. That is, a program defining each processing of the estimation apparatus 1 having the same functions as those of the estimation apparatus 1 is implemented as the program module 1093 in which computer-executable code is described. The program module 1093 is stored in, for example, the hard disk drive 1090. For example, the program module 1093 for executing the same processing as the functional configuration in the estimation apparatus 1 is stored in the hard disk drive 1090. The hard disk drive 1090 may be replaced with a solid state drive (SSD).

Further, configuration data to be used in the processing of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the above-described embodiment.

The program module 1093 or the program data 1094 is not limited to being stored in the hard disk drive 1090, and may be stored, for example, in a detachable storage medium and read by the CPU 1020 via the disc drive 1100 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

REFERENCE SIGNS LIST

1 Estimation apparatus
11 Model data
12 Normal vector data group
13 Normal packet data group
15 Abnormal packet data
16 Abnormal vector data
17 Similar normal packet data group
18 Abnormal byte
19 Inserted/deleted byte location
21 Conversion unit
22 Generation unit
23 Extraction unit
24 Estimation unit
241 Length comparison unit
242 Abnormal byte estimation unit
243 Inserted/deleted byte location estimation unit

The invention claimed is:

1. An estimation method, comprising: receiving an abnormal packet data identified as abnormal: extracting N normal pieces of packet data from a plurality of normal pieces of packet data by identifying the N normal pieces of packet data having the highest similarity scores related to the abnormal packet data, wherein the scores are calculated based on a natural language processing model and N is an integer;

determining whether a number of the extracted N normal pieces of packet data have a same packet length as the abnormal packet data and whether the number exceeds a threshold value;
determining that the number exceeds the threshold value;
in response to a determination that the number exceeds the threshold value, extracting same-length packet data having the same packet length as the abnormal packet data from the N normal pieces of packet data and comparing the abnormal packet data with the same-length packet data for each byte to estimate an abnormal byte location; and
determining that the number does not exceed the threshold value;
in response to a determination that the number does not exceed the threshold value, calculating an edit distance between the abnormal packet data and the N similar normal pieces of packet data to estimate an inserted or deleted byte location.

2. The estimation apparatus according to claim 1, wherein the processing circuitry is further configured to perform one-dimensional abnormality detection for treating each byte of the abnormal packet data and the same-length packet data as a value and comparing values.

3. The estimation apparatus according to claim 1, wherein N similar normal pieces of vector data with highest similarity scores relative to abnormal vector data obtained by converting the abnormal packet data using the natural language processing model are specified from among a plurality of normal pieces of vector data obtained by converting the plurality of normal pieces of packet data using the natural language processing model for converting the packet data into vector data in which each vector representing characteristics of a value of each byte of the packet data is associated with a byte, and the normal packet data before conversion of the N similar normal pieces of vector data is extracted as the N normal pieces of packet data.

4. The estimation apparatus according to claim 1, wherein the processing circuitry is further configured to use Bidirectional Encoder Representations from Transformers (BERT) as the natural language processing model.

5. An estimation method, comprising:
receiving an abnormal packet data identified as abnormal;
extracting N normal pieces of packet data from a plurality of normal pieces of packet data by identifying the N normal pieces of packet data having highest similarity scores relative to the abnormal packet data, wherein the scores are calculated based on a natural language processing model and N is an integer;
determining whether a number of the extracted N normal pieces of packet data have a same packet length as the abnormal packet data and whether the number exceeds a threshold value;
in response to a determination that the number exceeds the threshold value, extracting same-length packet data having the same packet length as the abnormal packet data from the N normal pieces of packet data and comparing the abnormal packet data with the same-length packet data for each byte to estimate an abnormal byte location; and
in response to a determination that the number does not exceed the threshold value, calculating an edit distance between the abnormal packet data and the N similar normal pieces of packet data to estimate an inserted or deleted byte location.

6. A non-transitory computer-readable recording medium storing therein an estimation program that causes a computer to execute a process comprising:
receiving an abnormal packet data identified as abnormal;
extracting N normal pieces of packet data from a plurality of normal pieces of packet data by identifying the N normal pieces of packet data having highest similarity scores relative to the abnormal packet data, wherein the scores are calculated based on a natural language processing model and N is an integer;
determining whether a number of the extracted N normal pieces of packet data have a same packet length as the abnormal packet data and whether the number exceeds a threshold value;
in response to a determination that the number exceeds the threshold value, extracting same-length packet data having the same packet length as the abnormal packet data from the N normal pieces of packet data and comparing the abnormal packet data with the same-length packet data for each byte to estimate an abnormal byte location; and
in response to a determination that the number does not exceed the threshold value, calculating an edit distance between the abnormal packet data and the N similar normal pieces of packet data to estimate an inserted or deleted byte location.

* * * * *